United States Patent
Liu et al.

(10) Patent No.: US 8,179,373 B2
(45) Date of Patent: May 15, 2012

(54) METHOD FOR DETECTING TOUCH POINTS OF TOUCH CONTROL DEVICE

(75) Inventors: Chen-Yu Liu, Jhongli (TW); Chun-Chi Lin, Singhua Village (TW)

(73) Assignee: TPK Touch Solutions Inc., Taipei (TW)

( * ) Notice: Subject to any disclaimer, the term of this patent is extended or adjusted under 35 U.S.C. 154(b) by 717 days.

(21) Appl. No.: 12/314,029

(22) Filed: Dec. 3, 2008

(65) Prior Publication Data

US 2010/0073307 A1    Mar. 25, 2010

(30) Foreign Application Priority Data

Sep. 23, 2008  (TW) ............................. 97136447 A

(51) Int. Cl.
*G06F 3/041*     (2006.01)
(52) U.S. Cl. ...................................................... 345/173
(58) Field of Classification Search .................. 345/173, 345/174
See application file for complete search history.

(56) References Cited

U.S. PATENT DOCUMENTS

| | | | |
|---|---|---|---|
| 5,181,030 A | 1/1993 | Itaya | |
| 7,148,881 B2* | 12/2006 | Lee et al. | 345/173 |
| 7,825,906 B2* | 11/2010 | Nakajima et al. | 345/173 |
| 2005/0275634 A1 | 12/2005 | Chi et al. | |
| 2009/0096766 A1* | 4/2009 | Liu | 345/174 |
| 2009/0160819 A1* | 6/2009 | Sasaki et al. | 345/174 |

FOREIGN PATENT DOCUMENTS

| | | |
|---|---|---|
| JP | 3201120 | 9/1991 |
| JP | 5241717 | 9/1993 |
| JP | 2000112642 | 4/2000 |

OTHER PUBLICATIONS

A communication from the Chinese patent office in a counterpart foreign application dated Jan. 8, 2010.

* cited by examiner

*Primary Examiner* — Fred Tzeng
(74) *Attorney, Agent, or Firm* — Gokalp Bayramoglu; Anna Tsang

(57) ABSTRACT

A method for detecting touch points of touch control device is disclosed. The touch control device comprises a first substrate having a first conductive layer and a second substrate having a second conductive layer. The first and second conductive layers are respectively connected to a control circuit which is coupled to a microcontroller. The control circuit performs driving on the first conductive layer to generate a gradient potential, and performs scanning on the second conductive layer to determine a first-axis coordinates. Then the control circuit drives the second conductive layer to generate a gradient potential, and performs scanning on the first conductive layer to determine the second-axis coordinates.

14 Claims, 9 Drawing Sheets

METHOD FOR DETECTING TOUCH POINTS OF TOUCH CONTROL DEVICE

FIELD OF THE INVENTION

The present invention relates to a touch control device, and in particular to a method for scanning and detecting multiple touch positions of a touch control device.

BACKGROUND OF THE INVENTION

Conventional touch panel mainly comprises a glass substrate with a transparent conductive layer (such as Indium Tin Oxide (ITO) conductive layer) on its surface. The glass substrate and the transparent conductive layer form a conductive glass. Another glass substrate or thin film coated with a corresponding transparent conductive layer on its bottom surface is arranged above the conductive glass. A plurality of insulation spacers are arranged between the transparent conductive layers of the glass substrate and the thin film for separating the transparent conductive layers from each other. A microcontroller alternately detects the voltage level in the X-axis and Y-axis and calculates and determines the location of touch at the touch panel.

In other conventional technology, a conductive layer is formed as a structure of elongate conductive strips and scanning is carried out to detect the location of touch. For example, U.S. Pat. No. 5,181,030 discloses a conductive layer having a structure comprised of a plurality of elongate conductive strips and the elongate conductive strips of two axial directions are perpendicular to each other, wherein the location of touch can be determined from the relationship between divided voltage and touched position. Also, U.S. Pat. No. 4,587,378 discloses a touch tablet having two-layer operating structure. The conductive pathways on one layer are orthogonally with respect to those conductive pathways on another layer. A potential is applied to one end of the conductive pathways, and the voltage output from the conductive pathways is detected to calculate the location of the touch point.

SUMMARY OF THE INVENTION

However, the conventional touch panel is designed to detect only single touch point. When two or more points are simultaneously touched, the touch panel is not able to detect the locations or cannot provide precise positions of the touch points. With the rapid progress of application software, the industry strives for developing touch panel capable of detecting multiple touch points.

Therefore, an objective of the present invention is to provide a method for detecting touch points of a touch control device comprising a first conductive layer and a second conductive layer. A driving voltage is alternately applied to generate a gradient potential at the conductive layers. By alternately performing driving and scanning operation on the first and second conductive layers, the touch positions of the touch control device are determined.

To fulfill the above objective, the present invention provides a method for determining touch positions of a touch control device. The touch control device comprises a first substrate having a first conductive layer and a second substrate having a second conductive layer. The first conductive layer is separated from the second conductive layer by a plurality of insulation spacers. The first and second conductive layers are respectively connected to a control circuit which is coupled to a microcontroller. The control circuit performs driving on the first conductive layer to generate a gradient potential, and scans the second conductive layer to determine a first-axis coordinates. Then the control circuit performs driving on the second conductive layer to generate a gradient potential, and scans the first conductive layer to determine the second-axis coordinates.

The technique of the present invention requires simple components and circuit system design and can detect one or more touch position of the touch control device. Therefore, the present invention is able to reduce loading of the microcontroller as well as complexity and difficulty for circuit system design. Compared to the known techniques, the present invention is advantageous in being simple in respect of circuit design and accurate in determination of touch positions.

DETAILED DESCRIPTION OF THE PREFERRED EMBODIMENTS

Figure 1:
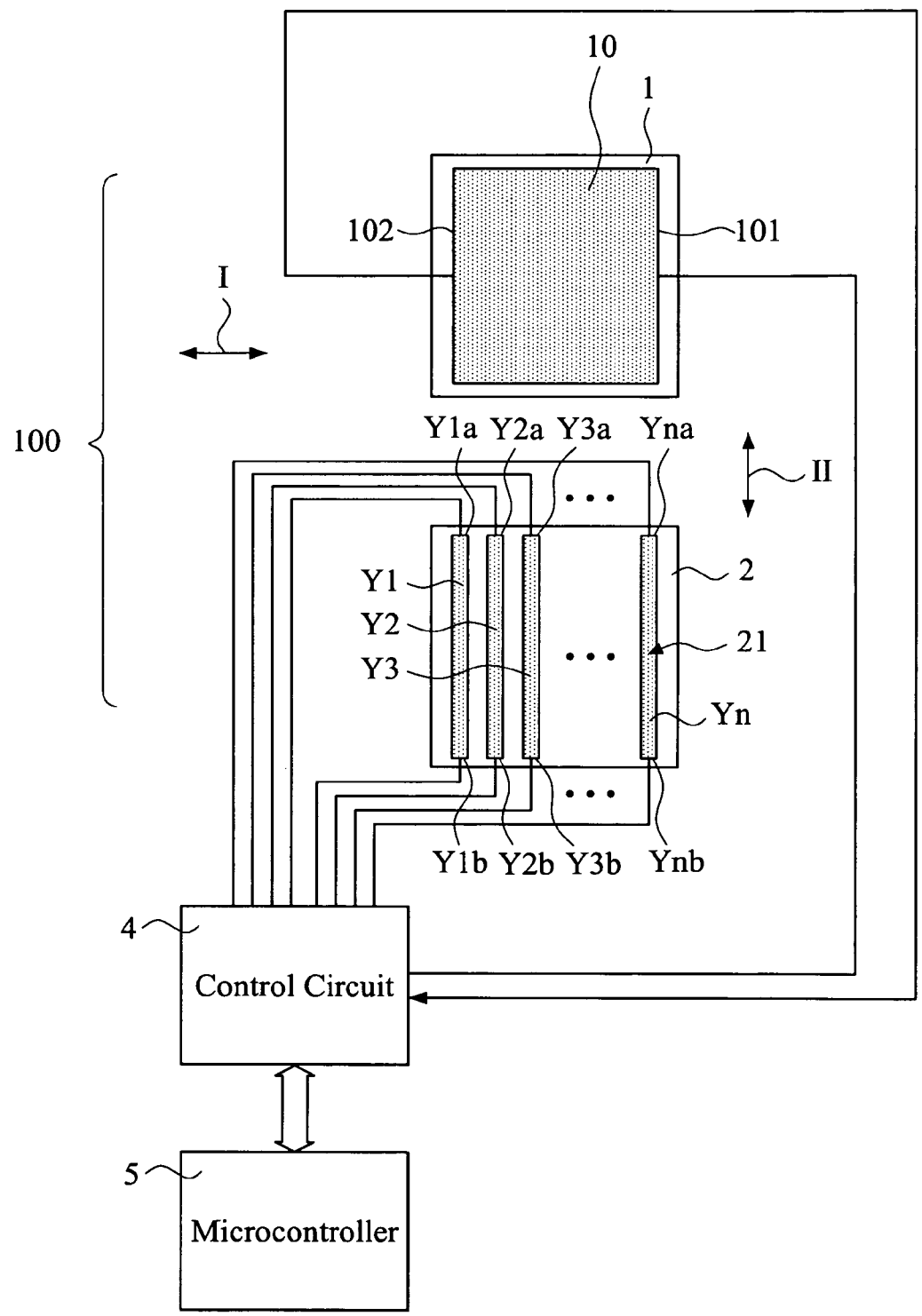
FIG. 1 shows a system block diagram of a touch control device in accordance with a first embodiment of the present invention.
Figure 2:
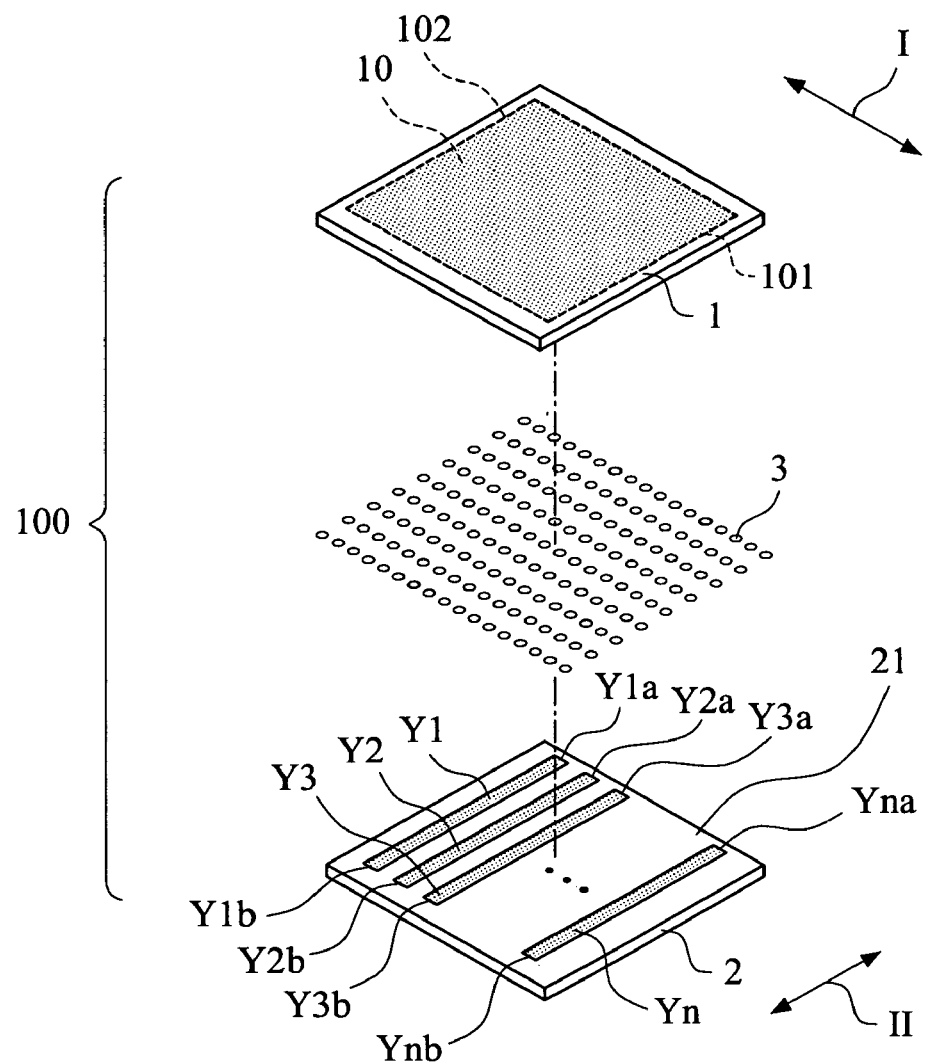
FIG. 2 is an exploded view of the touch control device of FIG. 1, showing that a first conductive layer is positioned correspondingly to a second conductive layer and is separated from the second conductive layer by a plurality of insulation spacers.

Please refer to FIG. 1 and FIG. 2. FIG. 1 shows a system block diagram of a touch control device in accordance with a first embodiment of the present invention and FIG. 2 shows an exploded view of the touch control device. As shown, a touch panel 100 comprises a first substrate 1 and a second substrate 2 arranged correspondingly to the first substrate 1. The first substrate 1 is separated from the second substrate 2 by a plurality of insulation spacers 3.

The first substrate 1 has a first conductive layer 10 in a form of a continuous plane on a bottom surface of the first substrate 1. In this embodiment, the first conductive layer 10 is formed of Indium Tin Oxide (ITO), extending from a first end 101 to a second end 102 along a first axis I. Both the first and second ends 101, 102 are connected to a control circuit 4 which is coupled to a micro-controller 5. A driving voltage of a predetermined potential is applied by the control circuit 4 to the first end 101 of the first conductive layer 10, and the second end 102 of the first conductive layer 10 is applied with a predetermined potential V2, zero voltage 0V or ground voltage G, such that the voltage forms a gradient potential on the first conductive layer 10.

The second substrate 2 has a second conductive layer 21 formed on a top surface of the second substrate 2. The second conductive layer 21 comprises a plurality of spaced elongate conductive strips Y1, Y2, Y3, . . . , Yn on the second substrate 2. Each of the elongate conductive strips Y1, Y2, Y3, . . . , Yn is parallel to each other along a second axis II, each having a first end Y1$a$, Y2$a$, Y3$a$, . . . , Yna and a second end Y1$b$, Y2$b$, Y3$b$, . . . , Ynb. Each first end Y1$a$, Y2$a$, Y3$a$, . . . , Yna and second end Y1$b$, Y2$b$, Y3$b$, . . . , Ynb of the elongate conductive strips Y1, Y2, Y3, . . . , Yn are electrically connected to the control circuit 4.

The control circuit 4 alternately performs driving and scanning on the first conductive layer 10 and the second conductive layer 21. A signal detected from the second conductive layer 21 is calculated to generate a first-axis coordinate x, and a signal detected from the first conductive layer 10 is calculated to generate a second-axis coordinate y.

Figure 3:
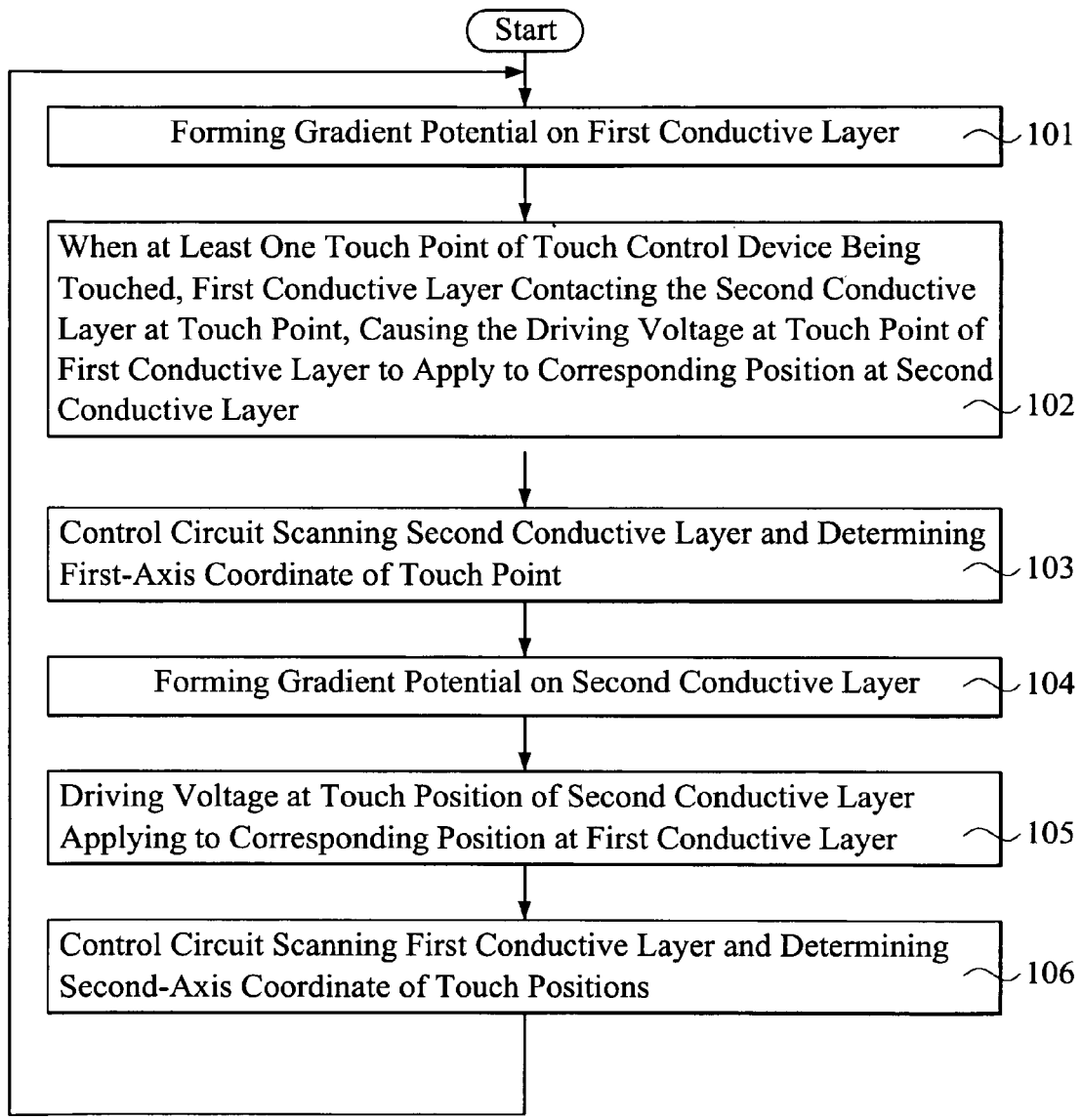
FIG. 3 is a flow chart of a method for detecting touch points in accordance with the first embodiment of the present invention.
Figure 4:
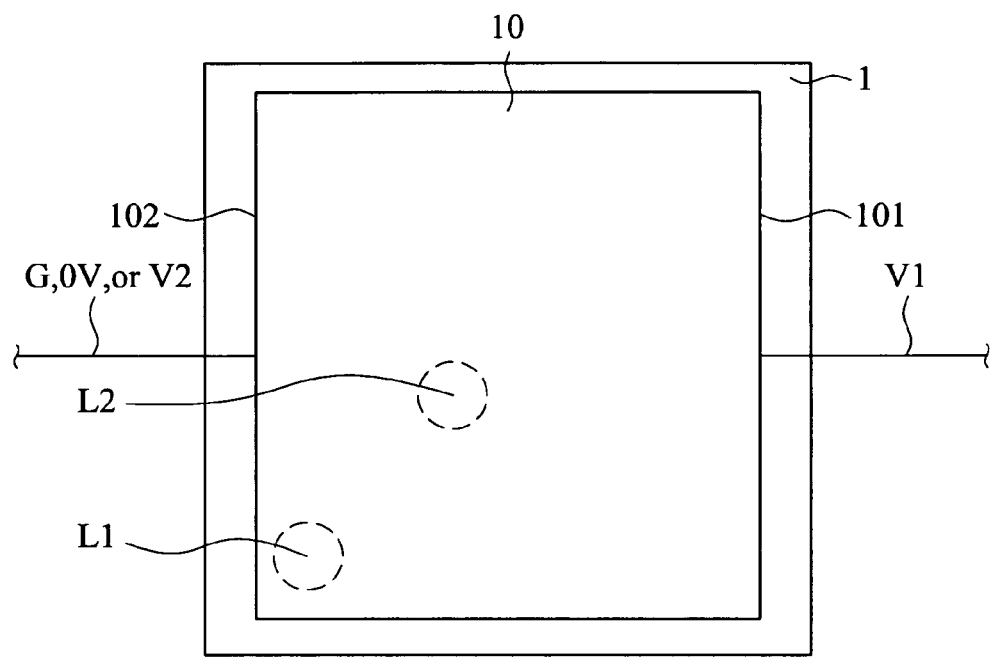
FIG. 4 shows a schematic view of the first embodiment, in which a gradient potential is formed on a first conductive layer and a second conductive layer is scanned.
Figure 4:
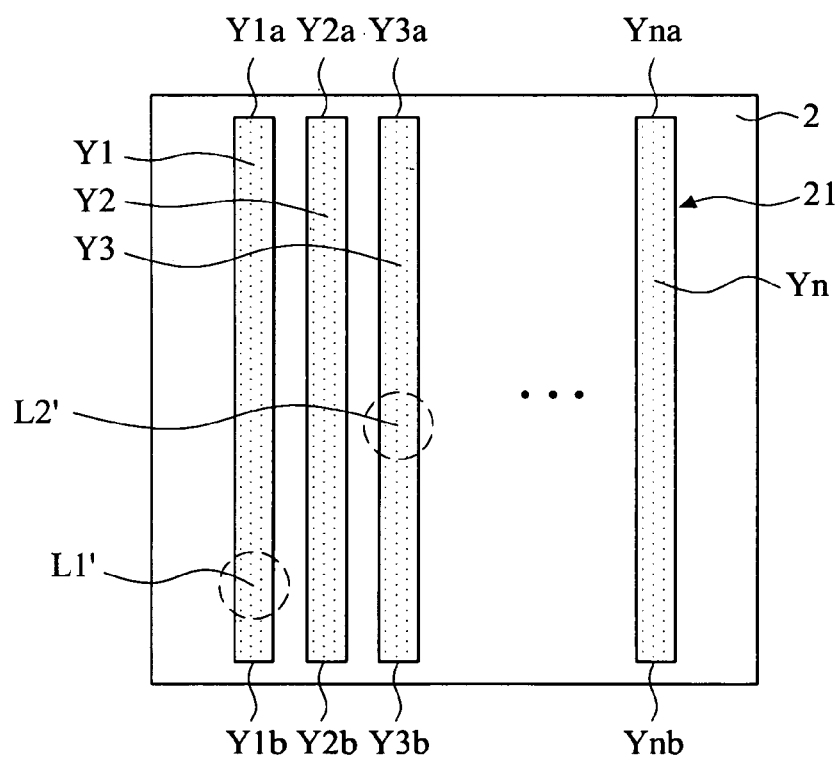
Figure 5:
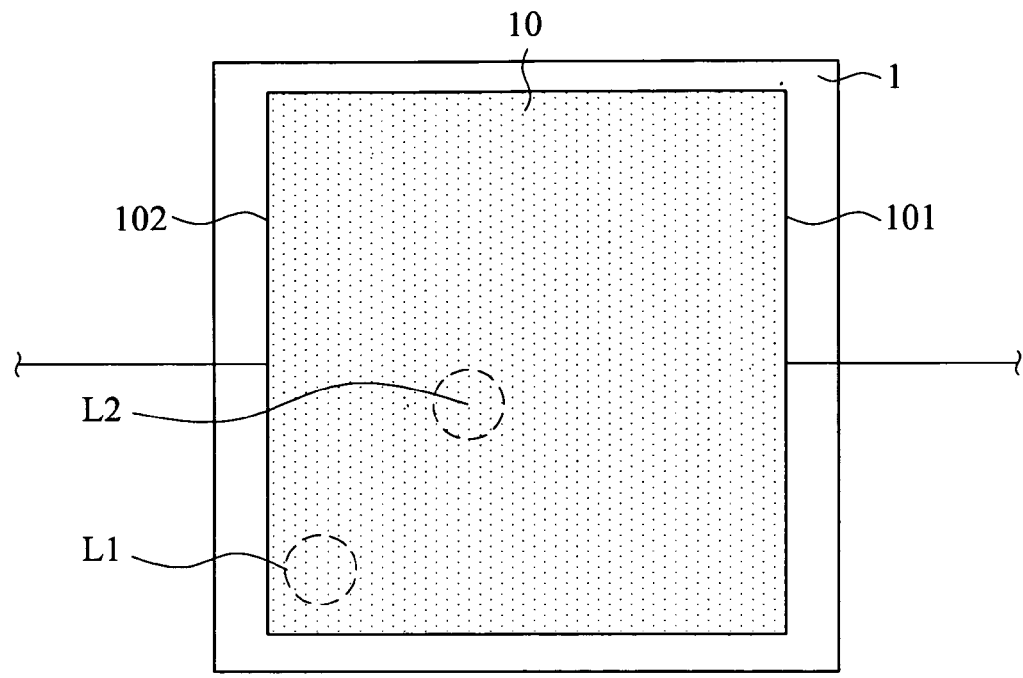
FIG. 5 shows a schematic view of the first embodiment, in which a gradient potential is formed on the second conductive layer and the first conductive layer is scanned.
Figure 5:
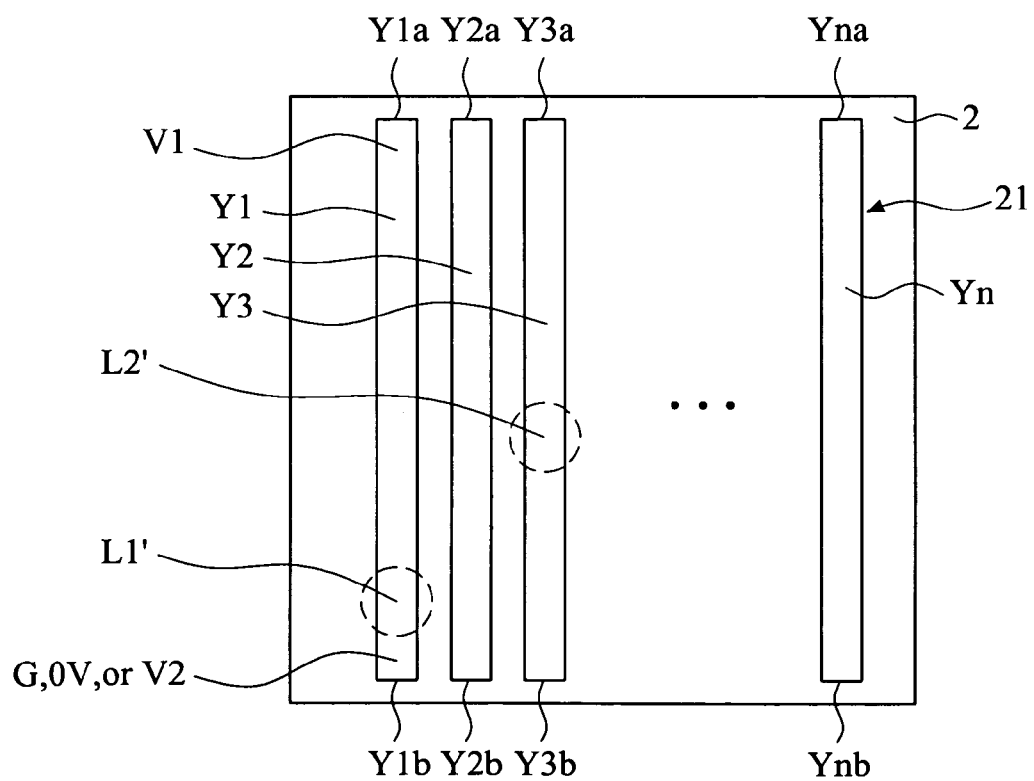

Please refer to FIGS. 3 and 4. FIG. 3 is a flow chart of a method for detecting touch points in accordance with the first embodiment of the present invention and FIG. 4 shows that a gradient potential is formed on a first conductive layer and a second conductive layer is scanned. Firstly, a predetermined potential V1 is applied as the driving voltage to the first end 101 of the first conductive layer 10 by the control circuit 4. The second end 102 of the first conductive layer 10 is applied with a predetermined potential V2 or zero voltage 0V or ground voltage G, such that a gradient potential is formed on the first conductive layer 10 in step 101.

Then at least one point of the touch control device 100 is touched, the first conductive layer 10 is pressed to contact the second conductive layer 21 at the touch point. Accordingly, the driving voltage at the touch point of the first conductive layer 10 is applied to a corresponding position at the second conductive layer 21 in step 102. When the control circuit 4 scans each of the elongate conductive strips Y1, Y2, Y3, . . . , Yn of the second conductive layer 21, the first-axis coordinate x of the touch point is determined (step 103).

As shown in FIG. 4, when a user simultaneously touches a plurality of points, e.g. at touch positions L1 and L2, the first conductive layer 10 is pressed to correspondingly contact positions L1' and L2' at the second conductive layer 21. When the control circuit 4 scans the second conductive layer 21, the control circuit 4 determines first-axis coordinates x of the respective touch positions L1 and L2 according to the detected signals.

Under the control of the microcontroller 5, the control circuit 4 applies a driving voltage of predetermined potential V1 to the first ends Y1$a$, Y2$a$, Y3$a$, . . . , Yna of the elongate conductive strips Y1, Y2, Y3, . . . , Yn of the second conductive layer 21. The second ends Y1$b$, Y2$b$, Y3$b$, . . . , Ynb of the elongate conductive strips Y1, Y2, Y3, . . . , Yn are connected to a predetermined potential V2 or zero voltage 0V or ground voltage G, such that the control circuit 4 generates a gradient potential sequentially on the elongate conductive strips Y1, Y2, Y3, . . . , Yn of the second conductive layer 21 in a sequential scanning manner (step 104).

In step 105, the driving voltages at the touch positions L1' and L2' of the second conductive layer 21 are applied to the corresponding touch positions at the first conductive layer 10. Then the control circuit 4 performs scanning on the first conductive layer 10 and determines the second-axis coordinates y of the respective touch positions in step 106.

By alternately performing driving and scanning operation to the first conductive layer 10 and the second conductive layer 21, the first-axis coordinates x and the second-axis coordinates y of the touch positions L1 and L2 can be determined.

Figure 6:
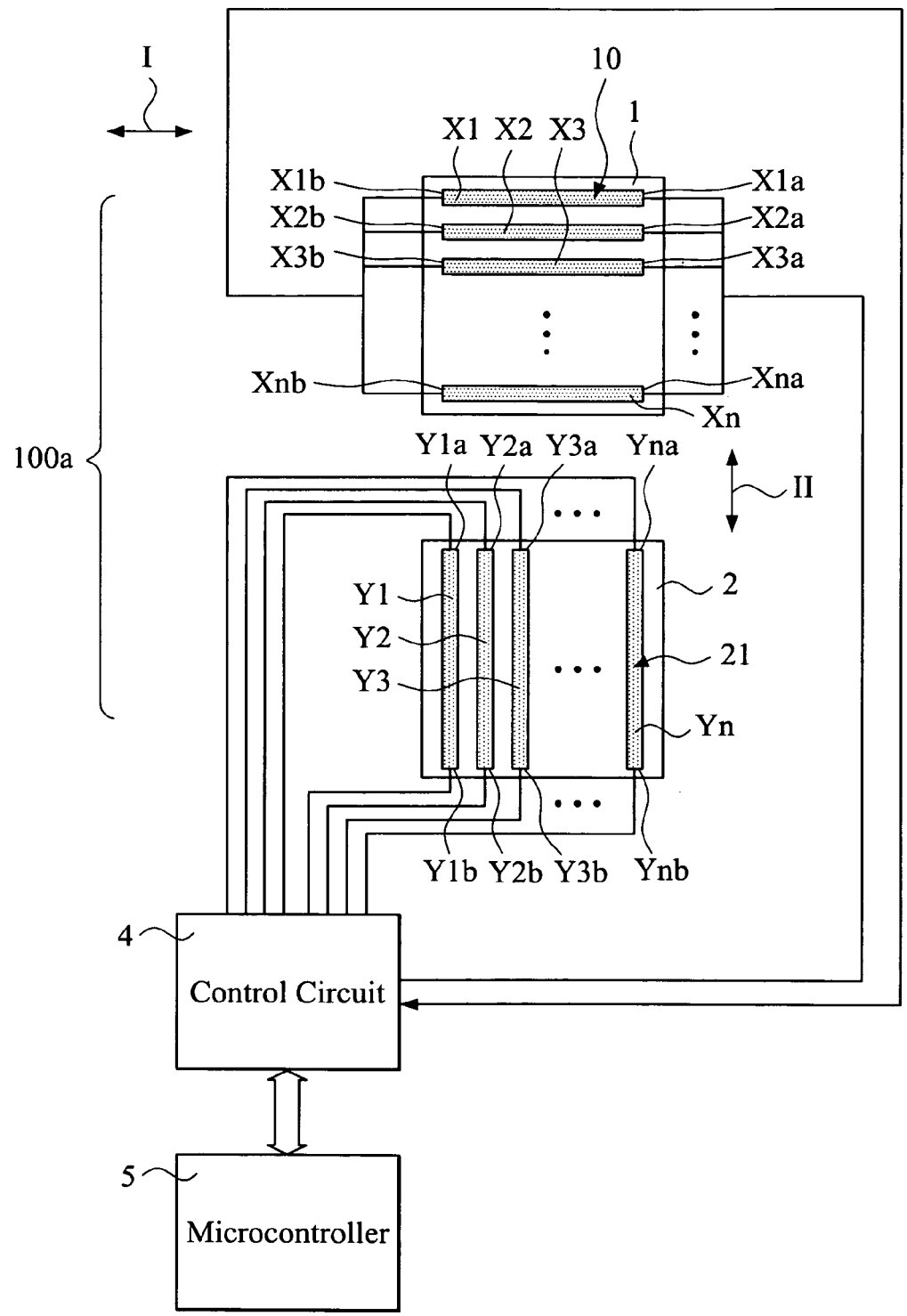
FIG. 6 shows a system block diagram of a touch control device in accordance with a second embodiment of the present invention.
Figure 7:
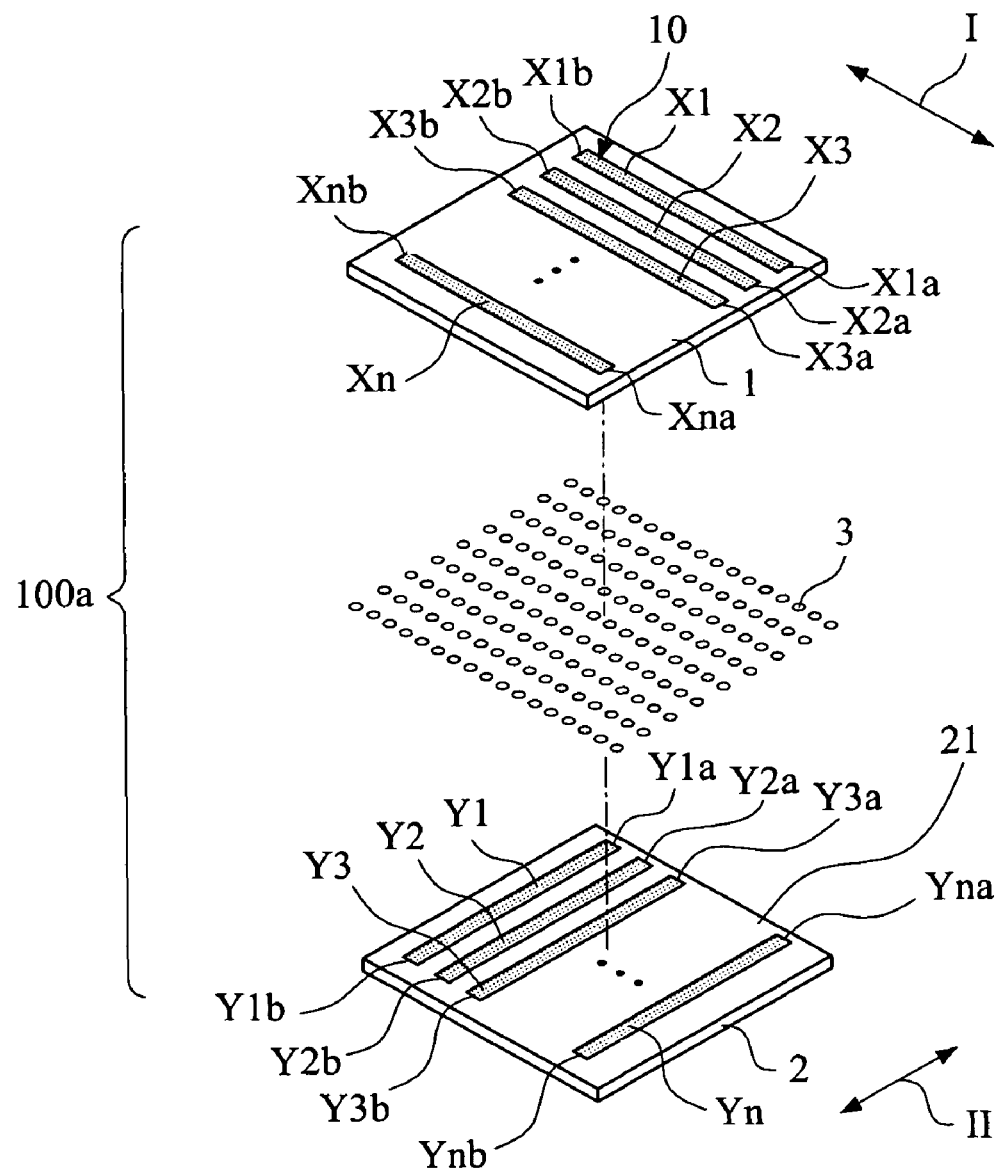
FIG. 7 is an exploded view of the touch control device of FIG. 6, showing that a first conductive layer is positioned correspondingly to a second conductive layer and is separated from the second conductive layer by a plurality of insulation spacers.

Please refer to FIGS. 6 and 7. FIG. 6 shows a system block diagram of a touch control device in accordance with a second embodiment of the present invention. FIG. 7 is an exploded view of the touch control device of FIG. 6, showing that a first conductive layer is positioned correspondingly to a second conductive layer and is separated from the second conductive layer by a plurality of insulation spacers In this embodiment, the first conductive layer 10 of the touch control device 100$a$ has strip structure that comprises a plurality of elongate conductive strips X1, X2, X3, . . . , Xn. Each of the elongate conductive strips X1, X2, X3, . . . , Xn is spaced from and parallel to each other to form a first end X1$a$, X2$a$, X3$a$, . . . , Xna and a second end X1$b$, X2$b$, X3$b$, . . . , Xnb on the bottom surface of the first substrate 1.

The other elements of the second embodiment are substantially identical to that of the first embodiment, and like reference numerals are used to identify similar or identical elements. During operation, the strip structure of the elongate conductive strips X1, X2, X3, . . . , Xn of the first conductive layer 10 of the second embodiment is substantially equivalent to the continuous plane structure of the first conductive layer 10 of the first embodiment. A gradient potential is formed between the first ends X1$a$, X2$a$, X3$a$, . . . , Xna and the second ends X1$b$, X2$b$, X3$b$, . . . , Xnb of the elongate conductive strips X1, X2, X3, . . . , Xn. Driving and scanning are alternately performed on the first conductive layer 10 and second conductive layer 21 to determine the coordinates of the plural touch points at the touch control device 100$a$.

Figure 8:
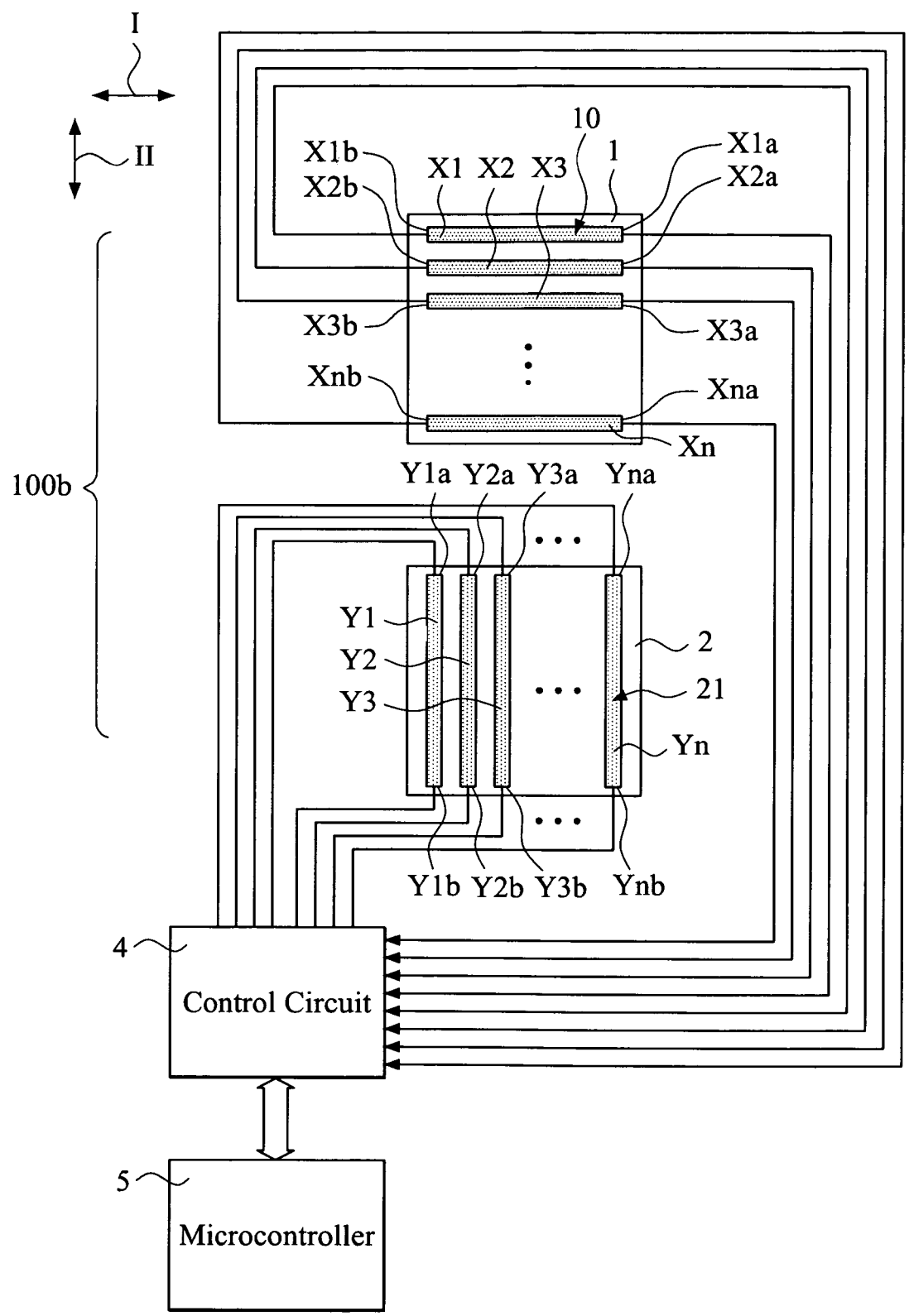
FIG. 8 shows a system block diagram of a touch control device in accordance with a third embodiment of the present invention.

FIG. 8 shows a system block diagram of a touch control device in accordance with a third embodiment of the present invention. The third embodiment is similar to the above second embodiment, and like reference numerals are used to identify elements that are similar or identical in the two embodiments. The difference is that the first ends X1$a$, X2$a$, X3$a$, . . . , Xna and the second ends X1$b$, X2$b$, X3$b$, . . . , Xnb of the elongate conductive strips X1, X2, X3, . . . , Xn is separately connected to the control circuit 4.

Figure 9:
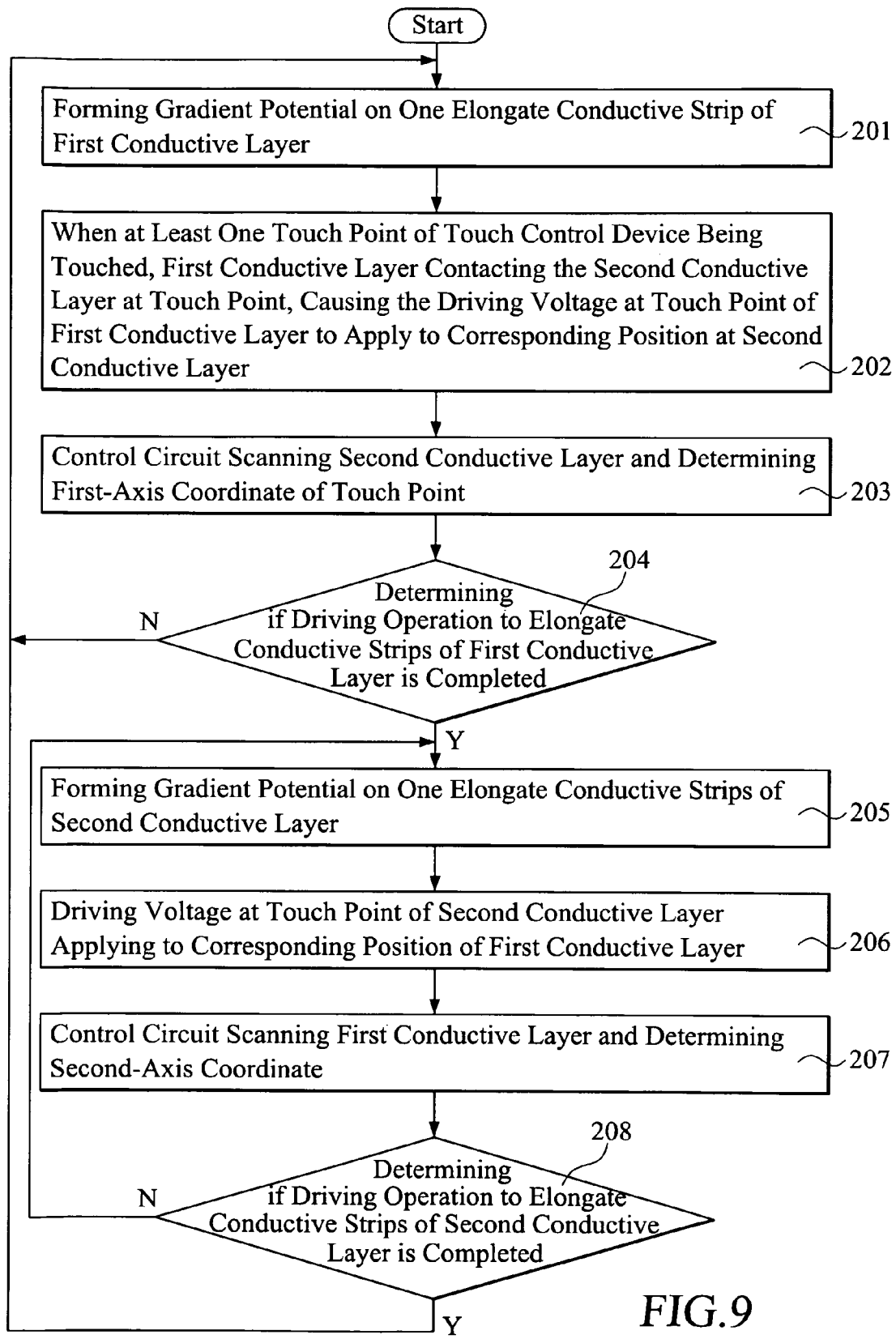
FIG. 9 is a flow chart of a method for detecting touch points in accordance with the third embodiment of the present invention.

FIG. 9 is a flow chart of a method for detecting touch points in accordance with the third embodiment of the present invention. Firstly, the control circuit 4 performs driving on the first conductive layer 10 and performs scanning on the second conductive layer 21. At operation, the control circuit 4 may apply a driving voltage to the elongate conductive strips X1, X2, X3, . . . , Xn in a sequential manner or in a simultaneous manner.

To operate in a sequential manner, the control circuit 4 applies a driving voltage of a predetermined potential V1 to the first end X1$a$, X2$a$, X3$a$, . . . , Xna of one of the elongate conductive strips X1, X2, X3, . . . , Xn, and the second end X1$b$, X2$b$, X3$b$, . . . , Xnb of the elongate conductive strip is connected to a predetermined potential V2 or zero voltage 0V or ground voltage G, such that a gradient potential is formed on one of the elongate conductive strips X1, X2, X3, . . . , Xn of the first conductive layer 10 (step 201). For example, the control circuit 4 generates a gradient potential on the elongate conductive strip X1, and then sequentially generates a gradient potential on the elongate conductive strip X2, X3, . . . , and Xn.

To operate in a simultaneous manner, the control circuit 4 applies a driving voltage of a predetermined potential V1 to the first ends X1a, X2a, X3a, ..., Xna of the elongate conductive strips X1, X2, X3, ..., Xn at the same time, and the second ends X1b, X2b, X3b, ..., Xnb are connected to a predetermined potential V2 or zero voltage 0V or ground voltage G, such that a gradient potential is formed on each of the elongate conductive strips X1, X2, X3, ..., Xn of the first conductive layer 10.

When at least one point of the touch control device 100b is touched, the first conductive layer 10 is pressed to contact the second conductive layer 21 at the touch point. Accordingly, the driving voltage at the touch point of the first conductive layer 10 is applied to a corresponding position at the second conductive layer 21 in step 202. When the control circuit 4 scans the second conductive layer 21, the first-axis coordinate x is determined (step 203).

The control circuit 4 may scan the elongate conductive strips Y1, Y2, Y3, ..., Yn of the second conductive layer 21 sequentially or simultaneously. To operate in a sequential manner, the control circuit 4 scans one of the elongate conductive strips, e.g. Y1, and then sequentially scans the other elongate conductive strips Y2, Y3,..., Yn. To operate in a simultaneous manner, the control circuit 4 scans all the elongate conductive strips Y1, Y2, Y3, ..., Yn at the same time.

In step 204, it is determined if the driving operation to the elongate conductive strips X1, X2, X3, ..., and Xn is completed. If the driving operation is not completed, the control circuit 4 goes back to step 201 to repeat the driving operation to the other elongate conductive strips.

When the driving operation to the elongate conductive strips X1, X2, X3, ..., and Xn is completed, the control circuit 4 drives the second conductive layer 21 and scans the first conductive layer 10. Similarly, the control circuit 4 can drive the elongate conductive strips Y1, Y2, Y3, ..., Yn of the second conductive layer 21 sequentially or simultaneously.

To operate in a sequential manner, the control circuit 4 applies a driving voltage of predetermined potential to the first end Y1a, Y2a, Y3a, ..., Yna of one of the elongate conductive strips Y1, Y2, Y3, ..., Yn. The second end Y1b, Y2b, Y3b, ..., Ynb of the elongate conductive strip Y1, Y2, Y3, ..., Yn are connected to a predetermined potential V2 or zero voltage 0V or ground voltage G, such that a gradient potential is sequentially formed on the elongate conductive strips Y1, Y2, Y3, ..., Yn of the second conductive layer 21, for example starting from the first elongate conductive strip Y1 (step 205).

To operate in a simultaneous manner, the control circuit 4 applies a driving voltage of predetermined potential V1 to the first ends Y1a, Y2a, Y3a, ..., Yna of the elongate conductive strips Y1, Y2, Y3, ..., Yn of the second conductive layer 21 at the same time. The second ends Y1b, Y2b, Y3b, ..., Ynb of the elongate conductive strips Y1, Y2, Y3, ..., Yn are connected to a predetermined potential V2 or zero voltage 0V or ground voltage G, such that a gradient potential is formed on the elongate conductive strips Y1, Y2, Y3, ..., Yn of the second conductive layer 21 simultaneously.

Then, the second conductive layer 21 applies driving voltage at the touch point to the corresponding touch position of the first conductive layer 10 in step 206. The control circuit 4 carries out scanning on the first conductive layer 10 to determine the second-axis coordinate y in step 207.

During the scanning operation, the control circuit 4 can scan the elongate conductive strips X1, X2, X3, ..., Xn sequentially or simultaneously. To operate in a sequential manner, the control circuit 4 scans one of the elongate conductive strips, e.g. the first conductive strip X1, of the first conductive layer 10. Subsequently, the control circuit 4 performs scanning to the other elongate conductive strips X2, X3, ..., Xn in a sequence order. To operate in a simultaneous manner, the control circuit 4 scans all the elongate conductive strips X1, X2, X3, ..., Xn at the same time.

In step 208, it is determined if the driving operation to the elongate conductive strips Y1, Y2, Y3, ..., and Yn of the second conductive layer 21 is completed. If the driving operation is not completed, the control circuit 4 goes back to step 205 and continues the driving operation to the other elongate conductive strips of the second conductive layer 21. If the driving operation is completed, the control circuit 4 goes back to step 201 and repeats the driving and scanning operation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for sensing at least one touch position of a touch control device, the touch control device comprising a first substrate having a first conductive layer and a second substrate having a second conductive layer opposite to the first conductive layer of the first substrate, the first conductive layer having a plurality of spaced and parallel elongate conductive strips along a first axis, each of the elongate conductive strips having a first end and a second end, the first end and second end of the elongate conductive strips being connected to a control circuit, the second conductive layer having a plurality of spaced and parallel elongate conductive strips along a second axis, each of the elongate conductive strips having a first end and a second end, the first end and second end of the elongate conductive strips of the second conductive layer being connected to the control circuit, the method comprising:

(a) the control circuit applying a driving voltage to the first ends of the elongate conductive strips of the first conductive layer, the second ends of the elongate conductive strips of the first conductive layer being connected to a predetermined potential such that a gradient potential is formed on the elongate conductive strips of the first conductive layer;

(b) pressing the first substrate at at least one touch position and causing the first conductive layer to contact the second conductive layer, and thereby applying the driving voltage on the first conductive layer to the second conductive layer at a position corresponding to the touch position;

(c) the control circuit performing scanning on the second conductive layer and determining a first-axis coordinate of the touch position;

(d) the control circuit applying a driving voltage to the first ends of the elongate conductive strips of the second conductive layer, and the second end of the elongate conductive strips of the second conductive layer being connected to a predetermined potential such that a gradient potential is formed at the elongate conductive strips of the second conductive layer;

(e) when at least one touch position of the touch control device is pressed, the first conductive layer contacting the second conductive layer at the touch position and the second conductive layer applying a driving voltage at a corresponding position to the first conductive layer;

(f) the control circuit performing scanning on the first conductive layer and determining a second-axis coordinate of the touch position; and (g) repeating steps (a) to (f).

2. The method as claimed in claim 1, wherein in step (a), the control circuit applying the driving voltage to the elongate conductive strips of the first conductive layer in a sequential manner.

3. The method as claimed in claim 1, wherein in step (a), the control circuit applying the driving voltage to the elongate conductive strips of the first conductive layer in a simultaneous manner.

4. The method as claimed in claim 1, wherein in step (c), the control circuit performs scanning on the elongate conductive strips of the second conductive layer in a sequential manner.

5. The method as claimed in claim 1, wherein in step (c), the control circuit performs scanning on the elongate conductive strips of the second conductive layer in a simultaneous manner.

6. The method as claimed in claim 1, wherein in step (d), the control circuit applying the driving voltage to the elongate conductive strips of the second conductive layer in a sequential manner.

7. The method as claimed in claim 1, wherein in step (d), the control circuit applying the driving voltage to the elongate conductive strips of the second conductive layer in a simultaneous manner.

8. The method as claimed in claim 1, wherein in step (f), the control circuit performs scanning on the elongate conductive strips of the first conductive layer in a sequential manner.

9. The method as claimed in claim 1, wherein in step (f), the control circuit performs scanning on the elongate conductive strips of the first conductive layer in a simultaneous manner.

10. A method for sensing at least one touch position of a touch control device, the touch control device comprising a first substrate having a first conductive layer and a second substrate having a second conductive layer opposite to the first conductive layer of the first substrate, the first conductive layer having a first end and a second end, the first end and second end of the first conductive layer being connected to a control circuit, the second conductive layer having a plurality of spaced and parallel elongate conductive strips along a second axis, each of the elongate conductive strips having a first end and a second end, the first end and second end of the elongate conductive strips of the second conductive layer being connected to the control circuit, the method comprising:

(a) the control circuit applying a driving voltage to the first end of the first conductive layer, the second end of the first conductive layer being connected to a predetermined potential such that a gradient potential is formed on the first conductive layer;

(b) pressing the first substrate at at least one touch position and causing the first conductive layer to contact the second conductive layer, and thereby applying the driving voltage on the first conductive layer to the second conductive layer at a position corresponding to the touch position;

(c) the control circuit performing scanning on the second conductive layer and determining a first-axis coordinate of the touch position;

(d) the control circuit applying a driving voltage to the first ends of the elongate conductive strips of the second conductive layer, and the second end of the elongate conductive strips of the second conductive layer being connected to a predetermined potential such that a gradient potential is formed at the elongate conductive strips of the second conductive layer;

(e) when at least one touch position of the touch control device is pressed, the first conductive layer contacting the second conductive layer at the touch position and the second conductive layer applying a driving voltage to the first conductive layer at a corresponding position;

(f) the control circuit performing scanning on the first conductive layer and determining a second-axis coordinate of the touch position; and (g) repeating steps (a) to (f).

11. The method as claimed in claim 10, wherein in step (c), the control circuit performs scanning on the elongate conductive strips of the second conductive layer in a sequential manner.

12. The method as claimed in claim 10, wherein in step (d), the control circuit applies a driving voltage to the elongate conductive strips of the second conductive layer in a sequential manner.

13. The method as claimed in claim 10, wherein the first conductive layer comprises a plurality of spaced and parallel elongate conductive strips.

14. The method as claimed in claim 10, wherein the first conductive layer comprises a continuous plane structure.

* * * * *